(12) United States Patent
Krantz

(10) Patent No.: US 6,829,834 B1
(45) Date of Patent: Dec. 14, 2004

(54) MULTI-ANGLE SELF-LEVELING LINE GENERATION

(75) Inventor: Norman Krantz, San Jose, CA (US)

(73) Assignee: Zircon Corporation, Campbell, CA (US)

(*) Notice: Subject to any disclaimer, the term of this patent is extended or adjusted under 35 U.S.C. 154(b) by 0 days.

(21) Appl. No.: 10/460,122

(22) Filed: Jun. 11, 2003

(51) Int. Cl.$^7$ .............................................. G01C 15/00
(52) U.S. Cl. ............................ 33/286; 33/281; 33/283; 33/291; 33/DIG. 21
(58) Field of Search .................... 33/286, 227, 281, 33/282, 283, 285, 291, DIG. 21

(56) References Cited

U.S. PATENT DOCUMENTS

| | | | |
|---|---|---|---|
| 5,481,809 A | 1/1996 | Rooney | |
| 5,537,205 A | 7/1996 | Costa et al. | |
| 5,572,797 A | 11/1996 | Chase | |
| 5,680,208 A | 10/1997 | Butler et al. | |
| 5,754,287 A | 5/1998 | Clarke | |
| 5,790,248 A | 8/1998 | Ammann | |
| 5,914,778 A | 6/1999 | Dong | |
| 5,992,029 A | 11/1999 | Dong | |
| 6,009,630 A | * 1/2000 | Rando | 33/365 |
| 6,249,983 B1 | * 6/2001 | Wright et al. | 33/286 |
| 6,542,304 B2 | 4/2003 | Tacklind et al. | |
| 6,577,388 B2 | * 6/2003 | Kallabis | 356/139.1 |
| 6,606,798 B2 | * 8/2003 | McCracken et al. | 33/290 |
| 6,625,895 B2 | * 9/2003 | Tacklind et al. | 33/286 |
| 2002/0178596 A1 | 12/2002 | Malard et al. | |

FOREIGN PATENT DOCUMENTS

| | | |
|---|---|---|
| EP | 0 602 131 | 6/1994 |
| EP | 1 026 476 | 8/2000 |

OTHER PUBLICATIONS

American Tool. (2003). "American Tool Strait–Line 64001 Laser Line Generator As Seen On TV" located visited on Jun. 5, 2003, 1 page.

Black & Decker. (2003). "Bulls Eye Auto Leveling Laser Line and Stud Finder" located at last visited on Jun. 5, 2003, 1 page.

Black & Decker. (2003). "Black & Decker BDL 100S BullsEye Laser Line Generator with Stud Finder" at last visited on Jun. 5, 2003, 1 page.

Craftsman. (2003). "Laser Trac™ Level with Carrying Case and Safety Glasses" located at last visited on Jun. 11, 2003, 3 pages.

* cited by examiner

Primary Examiner—Diego Gutierrez
Assistant Examiner—Amy R. Cohen
(74) Attorney, Agent, or Firm—Morrison & Foerster LLP

(57) ABSTRACT

A self-leveling tool for projecting a line of light along a wall or other vertical surface at one of a plurality of predetermined angles. The tool self-aligns to emit a plane of light at one of the predetermined angles (e.g., 0, 90, 180 or 270 degrees), thereby projecting a line on the wall in a desired direction (e.g., right, up, left or down).

31 Claims, 7 Drawing Sheets

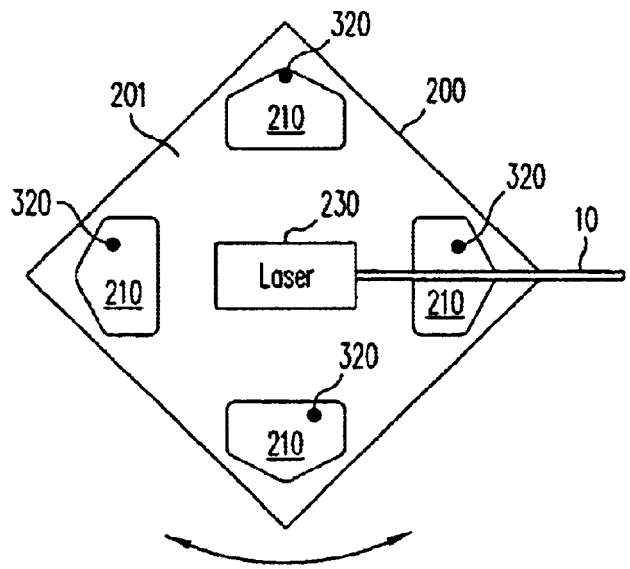
FIG. 3
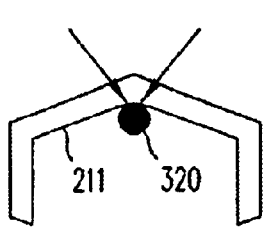   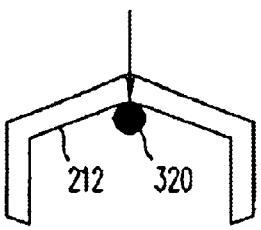   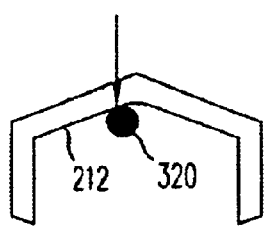
FIG. 4A          FIG. 4B          FIG. 4C
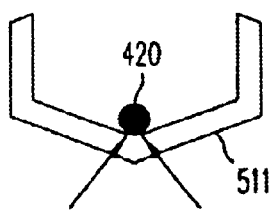   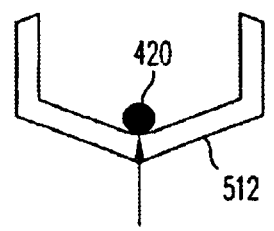   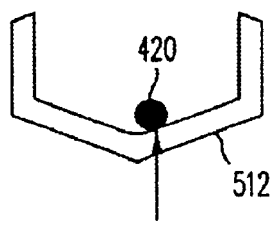
FIG. 7A          FIG. 7B          FIG. 7C

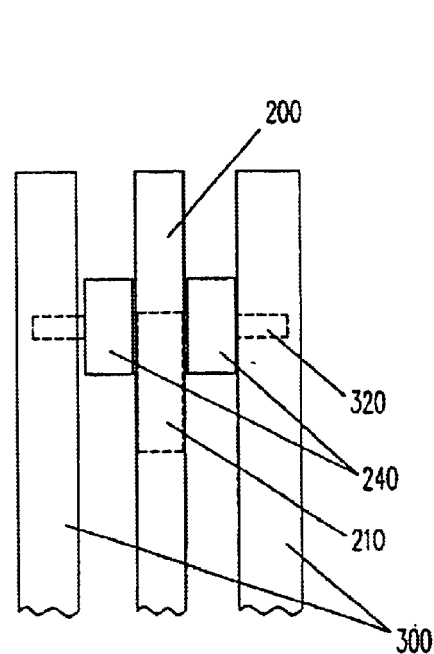
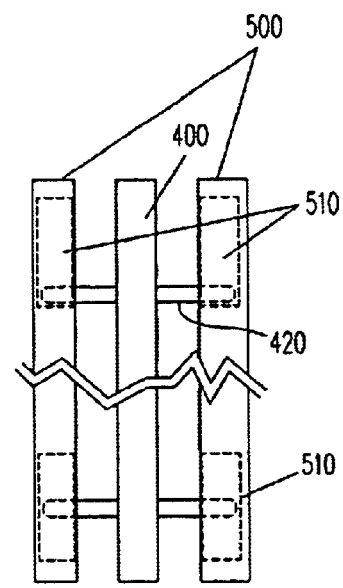
FIG. 5  FIG. 6
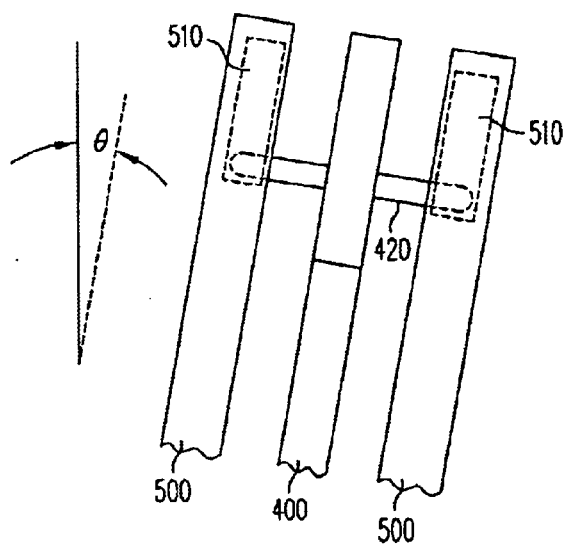
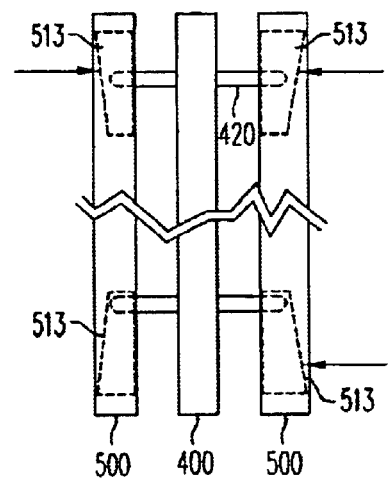
FIG. 8A  FIG. 8B

MULTI-ANGLE SELF-LEVELING LINE GENERATION

BACKGROUND OF THE INVENTION

Carpenters, mason workers, construction workers as well as home do-it-yourselfers require the ability to align objects either parallel or perpendicular to the direction of the Earth's gravitational pull. In recent years, a number of tools have been developed to project lines on walls and other vertical surfaces using lasers and laser diodes.

A variety of leveling tools have employed lasers to aid in placing a line on a wall or other vertical surface. Some leveling tools require a user to manually adjust the laser's orientation using one or more spirit levels as references. These tools emit a light beam defining line along a wall that may fall at any angle with respect to the wall but are only as accurate as the user's eye can provide.

To improve accuracy, other leveling tools use a laser diode mounted on a pendulum to automatically level the laser's emitted beam. Many pendulum levels use a knife's edge as a pivot axis or use a pin as a pivot point. Unfortunately, sharp knife edges and pin points are fragile and are easily damaged as a result of sharp impact forces.

Some tools employ pendulums to emit two beams of light: one horizontally to the left and another horizontally to the right. To emit a beam vertically upwards, still other leveling tools place a laser on a float suspended in a liquid. Each of these tools emit beams of light that are fixed in either a vertically plumb direction (up or down) or in a horizontal direction (left or right).

Known tools that emit self-leveling beams in more than one direction (up, down, left, right) require multiple lasers or multiple lenses and mirrors. For example, a tool that emits a plumb line up and horizontally to the right might use two separate lasers, one for each orientation. A tool that emits a plumb line both up and down, in addition to horizontally left and right might use four lasers. The addition of lasers and optics substantially increases the overall complexity and cost of the tool.

One factor, in determining the visible length that a tool will project light along a wall, is the perpendicular distance between the wall and the light source. The higher away from the wall that the beam originates, the farther the beam will be visible along the wall. Some known tools have a deep profile that is fixed allowing the tool to emit a beam significantly farther than other tools with lower profiles. One drawback to a deep profile tool is that it is physically larger than lower profile tools.

Therefore, there exists a need for an inexpensive and sturdy line generator that emits, on a vertical surface, a self-leveling vertical plumb line (light beam) either up or down, or a level horizontal line either left or right. Further, there exists a need for a tool that has the size advantage of being a low profile tool and the advantage of stand-off distance of a high profile tool.

BRIEF SUMMARY OF THE INVENTION

In some embodiments, a light emitting tool comprising a housing; a pendulum having a light source; and a plurality of receiving elements defined in one of the housing and the pendulum, and a plurality of extensions defined on the other of the housing and the pendulum; wherein the plurality of extensions define a plurality of pivot axes of the pendulum and the pendulum is substantially free in the housing; and wherein the receiving elements cooperatively interact with the plurality of extensions thereby to bound free movement of the pendulum.

In some embodiments, method to project a light beam to a surface in any one of four directions using a light emitting tool, the method comprising the acts of directing the tool towards the surface; rotating the tool to an orientation near that of the desired direction; and allowing the tool to self-balance, thereby projecting the light beam from the tool and towards the surface in the desired direction.

BRIEF DESCRIPTION OF THE DRAWINGS

FIG. 3 shows a front view of a pendulum in accordance with the present invention;

FIGS. 4A, 4B and 4C show a close up view of the area point and guiding boundaries cooperating with a pin in accordance with the present invention;

FIG. 5 shows a top-half side view of a pendulum operating with sidewalls in accordance with the present invention;

FIG. 6 shows a side view of another pendulum operating with another set of sidewalls in accordance with the present invention;

FIGS. 7A, 7B and 7C show a close up view of the pivot area and guiding boundaries cooperating with a pin in accordance with the present invention;

FIG. 8A shows a top-half side view of a system tilted at a slight angle in accordance with the present invention;

FIG. 8B shows a side view of a pendulum operating with sidewalls in accordance with the present invention;

DETAILED DESCRIPTION OF THE INVENTION

A self-leveling line generator operates to emit a pattern that projects a bright line 10 against a wall or other vertical surface. The line generator projects a line in any one of multiple predetermined discrete angles using a tool having a self-leveling mechanism. A pendulum is one example of a self leveling mechanism. The line generator may also include supporting axes, protrusions, or pivot pins for the self-leveling mechanism. For simplicity the figures show an embodiment utilizing pins to create pivot points or pivot axes. In place of this style of pin, other pins are extrusions or extensions having rounded, arced or sharp edges which may also be useful. The minimum spacing between adjacent discrete angles is determined by the physical attributes of the material used. Factors determining the minimum spacing include, for example, the interface between pivot axes and the surfaces supporting the pivot axes, the weight of the pendulum, the angle curvature of the pivot axes in relationship to the angle of curvature of the surface to which the pivot axes contact, and whether the pivot axes suspend or support the pendulum.

In one embodiment, the predetermined angles in a vertical plane are set to 0 degrees (right), 90 degrees (up), 180 degrees (left), and 270 degrees (down). In another embodiment, the predetermined angles are 0 degrees, 45 degrees, 90 degrees, 135 degrees, 180 degrees, 225 degrees, 270 degrees, and 315 degrees. An infinite combination of a fixed number of discrete angles may be combined to create a versatile multi-angle line generator.

To use a line generator in accordance with the present invention to generate a line on a vertical surface at a predetermined angle, a user turns on the line generator electric power, places the back side of the line generator against the vertical surface, then rotates the line generator to at least a rough approximation of a desired one of the predetermined angles. Meanwhile, an internal self-leveling pendulum mechanism falls into-place, which is a place associated with the desired predetermined angle, and then the pendulum comes to rest in a balanced position allowing a light source (e.g., laser) to emit light along the desired predetermined angle.

Figure 1:
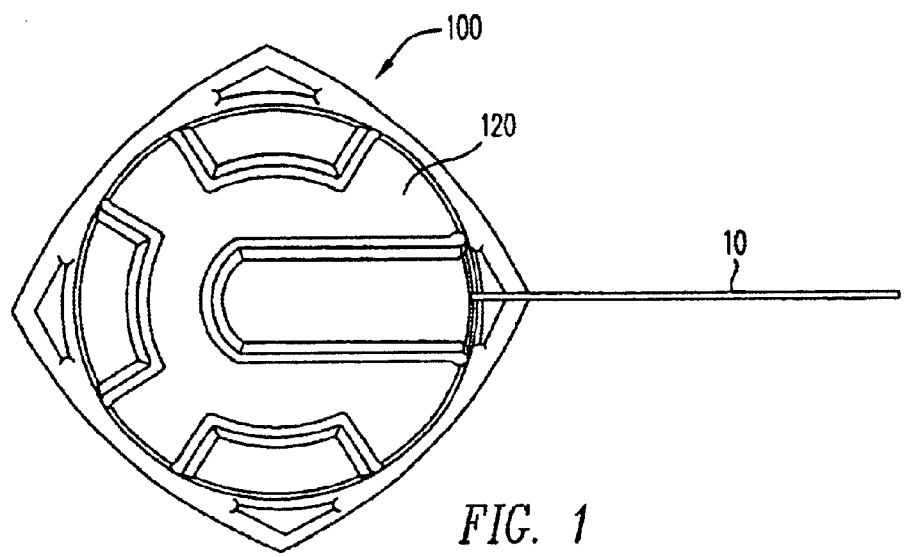
FIG. 1 shows a front view of a self-leveling wall line generator in accordance with the present invention.

FIG. 1 shows a front view of a self-leveling wall line generator 100 emitting light beam 10 in accordance with the present invention. In some embodiments of the present invention, the line generator 100 has an internal pendulum and a housing (neither visible). The pendulum and housing may be packaged within a shell 120. Alternatively, the function of the housing and shell 120 may be shared by one or more integrated pieces.

Figure 2A:
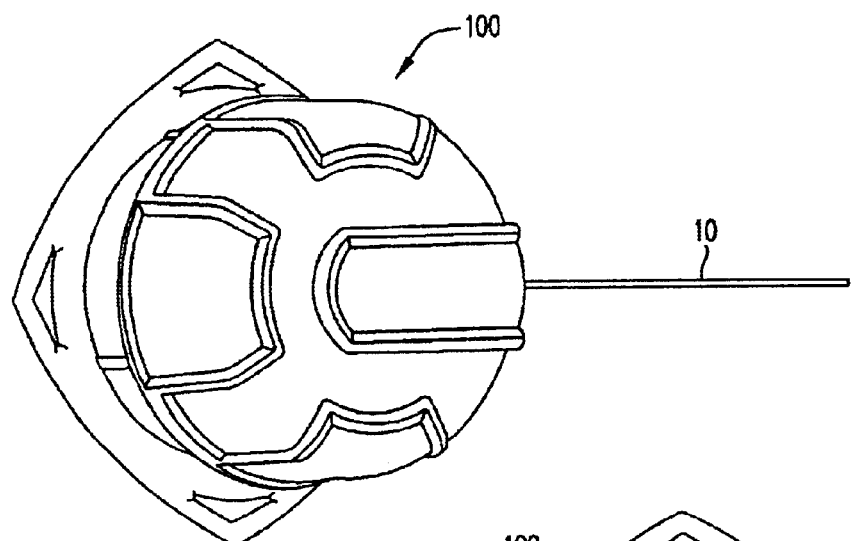
FIGS. 2A, 2B, 2C and 2D show various perspective views of a self-leveling wall line generator operating in four different orientations in accordance with the present invention.
Figure 2C:
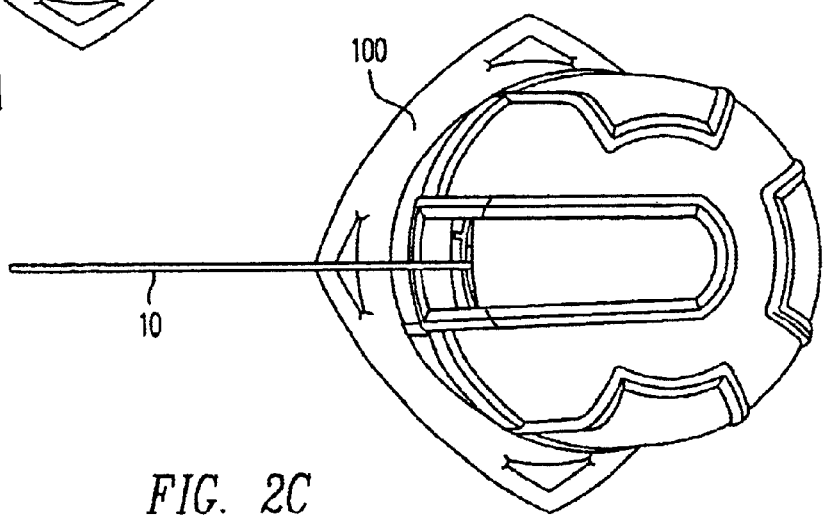
Figure 2B:
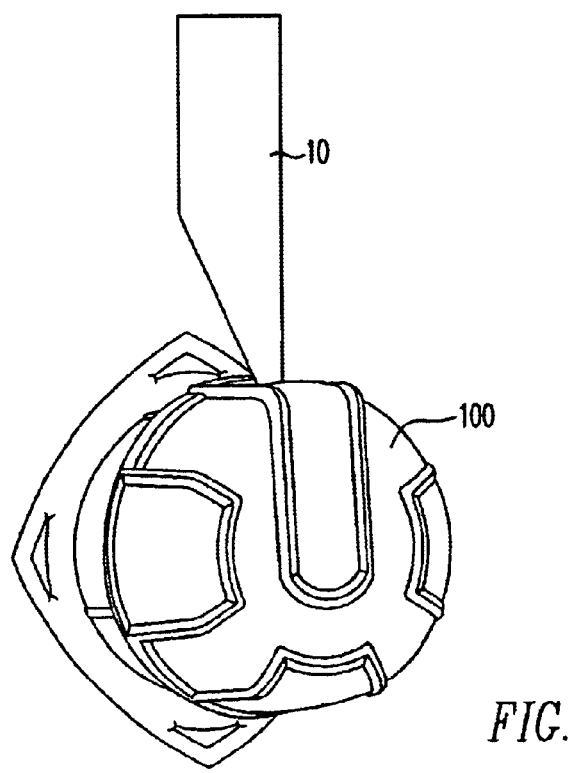
Figure 2D:
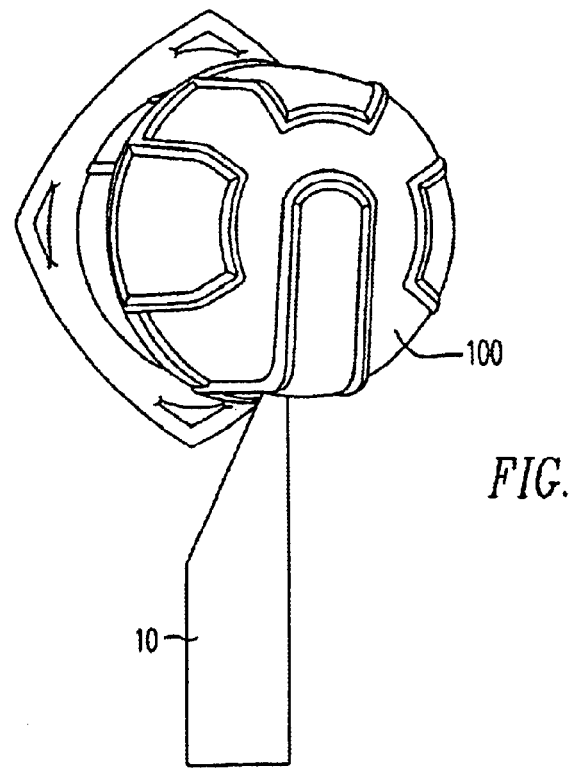

FIGS. 2A, 2B, 2C and 2D show various perspective views of a self-leveling wall line generator 100 operating in four different orientations in accordance with the present invention. FIG. 2A shows a view of a line generator 100 emitting a pattern that creates a level line 10 (the light beam) on a wall to the right of the line generator 100. FIG. 2B shows a view of a line generator 100 emitting a pattern that creates an upwards plumb line 10 above the line generator 100. FIG. 2C shows a view of a line generator 100 emitting a pattern that creates a level line 10 to the left of the line generator 100. FIG. 2D shows a view of a line generator 100 emitting a pattern that creates a downwards plumb line 10 below the line generator 100.

FIG. 3 shows a front view of a pendulum 320 for pendulum 200 for the line generator 100 in accordance with the present invention. The pendulum 200 includes a body 201, where body 201 defines multiple open volumes 210, and a laser assembly 230. The body 201 includes one or more heavy materials such as dense plastics, metals or alloys. If the body 201 is constructed of metals, nonferrous metals such as zinc, brass, aluminum, copper, nickel, bronze, lead, silver or gold may be used. The laser assembly 230 may be a laser diode, another type of laser, or non-laser light emitting source.

Pins 320 and open volumes 210 act to bound the range of motion that the pendulum 200 may move within line generator 100. The pendulum 200 is not mounted to the housing (not shown) but is rather free-moving. The pins 320 are fixed with relation to each other but allow the separate pendulum 200 to float, drop, fall and rotate within bounds determined by a relationship among corresponding pins 320 and open volumes 210.

Each open volume 210 represents a predetermined angle. When an open volume 210 is engaged, a pivot axis or pin 320 associated with that open volume 210 supports the pendulum 200 in a suspended free-swinging state. The other pins lose contact with the free-swinging pendulum 200. When the line generator is rotated such that a different open volume 210 is engaged, the pendulum 200 drops in place, thereby activating a different, pin 320 as the pivot point freeing the previous engaged pin, and thereby defining a new pivot axis.

The orientation that a user selects from the multiple orientations available determines which pin 320 acts as a current pivot point or pivot axis of the pendulum 200. Other pins 320 and open volumes 210 not currently acting as pivots act in combination to limit and bound the pendulum's 200 maximum allowed swing angle.

FIGS. 4A, 4B and 4C show a close up view of open volumes cooperating with a pin 320 in accordance with the present invention. FIG. 4A shows a cross-section of an open volume 211 (similar to that shown in FIG. 3 as open volume 210). The open volume 211 guides the pin 320, thereby guiding and bounding the pendulum 200 in relationship to the housing (not shown). The figure shows the open volume 211 having a cross-section of two planes joining at an obtuse angle where an engaged pin 320 will tend to fall. Since the open volume 211 is defined by the pendulum 200, the weight of the pendulum 200 rests on the edge of the pin 320.

As the pendulum 200 drops into place, the pin 320 is directed by gravity toward the intersection of the two planes of the inner surface of the open volume 211. The contact area between the pin 320 and a boundary of an open volume 211 may be along a plane such that the pin 320 contacts the boundary of the open volume 211 along an area represented by a line. Alternatively, the contact area may be along a sharp or rounded edge of the open volume 211 such that the pin 320 contacts the boundary of the open volume 211 at an area represented by a point.

If the two planes join at a distinct angle, as shown in FIG. 4A, the pin 320 may contact the inner surface of the open volume 211 at two distinct areas: one area on the first plane and another area on the second plane. If the pin 320 thus contacts the open volume 211 at two distinct areas it is possible that, unwanted friction may cause inaccuracies in the balancing of the pendulum. Alternatively, if the junction between the two planes or edges is appropriately rounded, as in FIG. 4B, the pin 320 will only contact the inner surface of the open volume 212 at a single area, thereby reducing potentially adverse effects of multiple contact areas.

FIG. 4C shows a pin 320 that fails to rise to the highest point in the angle defined by the two lanes of the inner surface of the open volume 212. Because the junction of the two planes is appropriately rounded to a radius of curvature greater than the radius of curvature of the pin 320, the pin 320 makes contact with the open volume 212 at only a single area.

FIG. 5 shows a top-half side view of a pendulum 200 operating with housing sidewalls 300 in accordance with the present invention. Front and back sidewalls 300 operate together to support a pendulum 200. In the embodiment shown, the front and back sidewalls 300 are held together by pins 320. The pendulum 200 lies floating between and bounded by the sidewalls 300 and pins 320. The pins 320 pass though the open volumes 210 of the pendulum 200. As can be seen in the figures, the pendulum 200 has the freedom to move within a limited range independently of the sidewalls 300 and pins 320.

Optional spacers or bushing 240 are used to center the pendulum 200 between the sidewalls 300. By including the optional spacers 240, less surface area of the swinging pendulum 200 makes contact with non-swinging elements of the structure thereby reducing drag. Excessive drag or friction may lead to inaccuracies in the final resting position of the pendulum 200 relative to Earth's gravitational pull. The bushings 240 also have a beneficial effect of keeping the pendulum 200 substantially parallel to the sidewalls 300 even when the line generator 100 is slightly tilted as may happen when the line generator 100 is placed on an uneven wall.

Other embodiments of the present invention fix the pivot extrusions or pins to the pendulum, rather than to the housing sidewalls. In this case, the open volumes are defined by the sidewalls rather than by the pendulum. By exchanging the support of the pins and position of the open volumes, bushings are no long useful. Additionally, potentially more accuracy may be gained by reducing friction due to excessive contact at non-pivot points.

FIG. 6 thus shows a side view of another pendulum 400 operating with housing sidewalls 500 in accordance with another embodiment of the present invention. The line generator 100 includes a pendulum 400 and front and back sidewalls 500. The pendulum 400 has extensions (extrusions or pins) 420, which are fixed to the pendulum 400. The sidewalls 500 define wells, depressed areas or open volumes (receiving elements) 510 for accepting and bounding the pins 420. The front and back pair of sidewalls 500 operate together to support the pendulum 400. The pendulum 400 floats between and is bounded by the interaction among the pins 420 of the pendulum 400 and the open volumes 510 of the sidewalls 500. The pendulum 400 freely moves between the sidewalls 500 within predetermined limits set by the dimensions of the pins 420 in relation to the dimensions of the open volumes 510.

FIGS. 7A, 7B and 7C show a close up view of the pivot area and open volumes cooperating with a pin in accordance with the present invention. As FIGS. 4A–4C show, the interaction between a pin and an inner surface of an open volume 511, 512, of FIGS. 7A–7C have a similar interaction. If a pin 420 is part of the pendulum 400 rather than part of the sidewalls 500, the weight of the pendulum 400 rests on an inner surface of the open volume 511.

The open volume 511 inner surface guides the pin 420, thereby guiding and bounding the pendulum 400 in relation to the sidewalls 500. FIG. 7A shows a cross-section of two planes joining at an obtuse angle to define this inner surface. As the pendulum 400 drops into place, the pin 420 is directed by gravity toward the intersection of the two planes of the open volume 511. Contact between a pin 420 and a boundary of an open volume 511 may be along a plane such that the pin 420 contacts the boundary of the open volume 511 along an area represented by a line. Alternatively, the contact area may be along a sharp or rounded edge of the open volume 511 such that the pin 420 contacts the boundary of the open volume 511 at an area represented by a point.

If the two planes join at a distinct angle as shown in FIG. 7A, the pin 420 may contact the surface of the open volume 511 at two distinct areas: one on the first plane and another on the second plane. If a pin 420 contacts the boarder of the open volume 511 at two distinct areas, it is possible that unwanted friction may cause inaccuracies in the balancing of the pendulum.

Alternatively, if the junction between the two planes or edges is appropriately rounded as in FIGS. 7B and 7C, a pin 420 will only contact the boundary of the open volume 511 at a single area, thereby potentially reducing the adverse effects of multiple contact areas. FIGS. 7B and 7C show the angle between the two planes of the open volume 510 to be rounded, thereby allowing the pin 420 of the pendulum 400 to make contact with the open volume 512 at a single area at the rounded area. FIG. 7B shows that the pin has fallen to its lowest point. FIG. 7C shows that the pin has fallen near to its lowest point. The structures of both FIGS. 7B and 7C provide the accuracy of a single area of contact. For additional reduction of friction, dry or wet lubricants may be used along the surfaces of the open volume 510 that make contact with the pins 420.

FIG. 8A shows a top-half side view of a line generator 100 tilted at a slight angle in accordance with the present invention. If a user places line generator 100 on an uneven or non-true wall, the line generator 100 might not be in line with the Earth's gravitational pull. Because the pendulum 400 is fixed to the pins 420, the pendulum 400 does not slide along the pin 420. A lever arm created by an engaged pin 420 in relation to the center of mass of the pendulum 400 permits the pendulum 400 to operate without rocking out of the grove of the open volume 510 in which the pin 420 rests. Past a critical angle θ, an engaged pin 420 tends to pull away from one of the two engaged open volumes 510. Other pins 420 that are not engaged as pivot axes may tend to scrape against one of the vertical walls of the open volume 510 occupied by those pins. Even if the line generator 100 is perfectly parallel to the Earth's pull, small variations in material dimensions may hinder the free swinging of the pendulum 400. Such variations may cause an unengaged pin 420 to rub against the side of a corresponding open volume 510.

FIG. 8B shows a side view of a pendulum 400 cooperating with housing sidewalls 500 in accordance with some embodiments of the present invention intended to address the technical issue shown in FIG. 8A. To alleviate the rubbing associated with tolerances and tilting, the inner vertical sides of the open volumes 513 are tapered so that unengaged pins 420 have clearance at both ends of the pins 420. An open volume 513 may be configured such that an engaged pin 420 snugly fits into the groove of the open volume 513, thereby allowing for little spare lateral movement of the pin 420 and the pendulum 400 along the groove. Due to the tapered sides of the open volumes, the unengaged pins 420 have enough clearance from the tapered sides of the open volume 513 such that the unengaged pins 420 no longer rub against the sides of the open volume 513.

Figure 9:
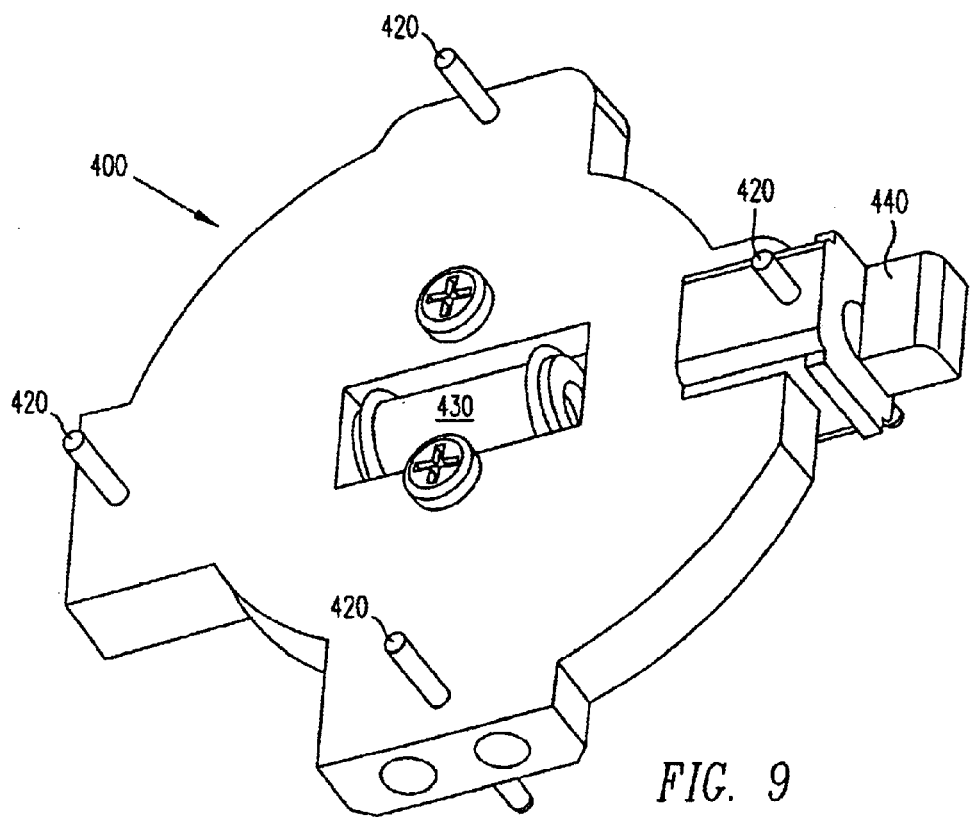
FIG. 9 shows a perspective view of a pendulum in accordance with the present invention.

FIG. 9 shows a perspective view of a pendulum 400 in accordance with the present invention. Four pins 420 define four pivot axes. A laser diode assembly 430 is mounted towards the center of the pendulum 400. If mounted just off center, the laser 430 emits a beam that is not blocked by a pin 420 of the type that passes from one side of the pendulum 400 through to the other side of the pendulum that is located nearest the beam's path. Light emitted by the laser 430 travels through a passage or opening in the pendulum 400 to a lens 440. The lens 440 creates a pattern that fans out the light emitted by the laser 430 into a plane of light. The fanned out light projects from the pendulum and line generating tool 100 as a plane of light so as to project a line on the vertical surface. The lens 440 may be any of a number of lenses known to diffract light in a plane or other pattern. The pattern produced by the lens 440 is not meant to be limited. Other lenses may be used instead of lens 440, such as a cross-section of a clear glass or plastic rod. Alternatively, lenses that employ diffractive gratings may be used. If batteries for the laser are located separately from the pendulum 400, power may be supplied to the laser 430 through thin flexible conductive leads (not shown).

Alternatively, a lens may be used to project other patterns besides a fanning patter described above. Other lenses may be used such as lenses that produce one or more single points, one or more dotted lines, or one or more horizontal lines (e.g., a single line perpendicular to the pendulum's swing), or lenses that produce a cross pattern or grids. Similarly, a lens that produces an image or icon, such as those lenses that incorporate a hologram, may be used.

Such alternate lenses enhance the use of the generator 100 for use apart from a vertical surface. By placing the generator 100 on a tripod, table or other substantially horizontal surface, the generator can create a projection on a distant wall. The same projection can be created on the ceiling or floor simply by rotating the orientation of the generator to point either up or down, respectively. The laser's beam may be projected nominally perpendicular to wall, rather than along the surface of the wall. As such, the generator 100 may be used to create a pattern on a distant surface that with which the generator is not in contact.

The center of mass of the pendulum 400 may be set by adjustment screws (not shown). By adjusting the center of mass to a location that intersected by the multiple pivot axes, the properly balanced pendulum will emit light along the vertical surface in a line aligned with the desired predetermined angle. This is typically a factory adjustment.

Figure 10:
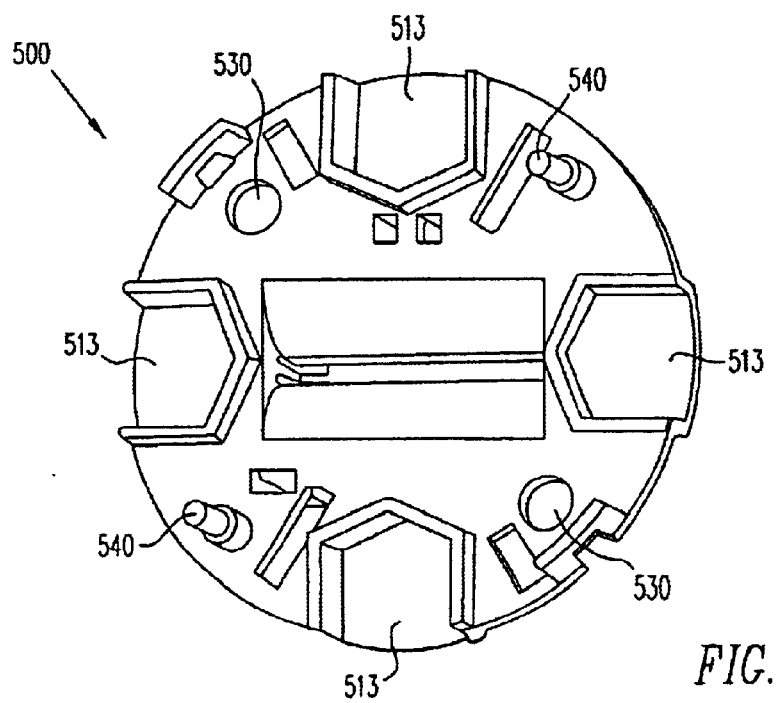
FIG. 10 shows a perspective view of a sidewall in accordance with the present invention.

FIG. 10 shows a perspective view of a sidewall 500 in accordance with the present invention. The sidewall 500 defines open volumes 513 having housing sides and (optional) recesses 530 for magnets (not shown) used for electromagnetic braking (damping). If the pendulum of the line generator 100 contains ferrous or nonferrous metal, magnets may be placed on each side of the pendulum to damp the pendulum's swing. As the pendulum passes through the magnetic field of the magnets, kinetic energy is converted to eddy currents in the metal to damp its movement.

The sidewall 500 also includes posts 540 that are used to joint a first sidewall 500 to corresponding holes in a second complementary sidewall 500. By configuring the pendulum 400 (see FIG. 9) in an oblong shape, the posts 540 do not interfere with the swinging or other movement of the pendulum 400.

Figure 11:
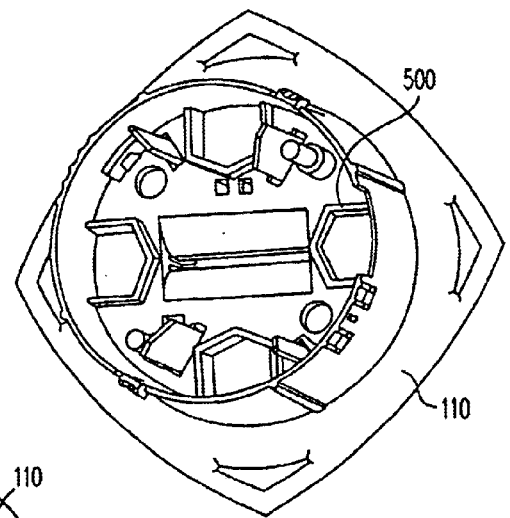
FIG. 11 shows a rear perspective view of an opened housing containing the first of two side walls in accordance with the present invention.

FIG. 11 shows a rear perspective view of an opened housing shell 110 containing the first of two sidewalls 500 in accordance with the present invention. During manufacturing and assembly, the first sidewall 500 is placed inside a housing shell 110.

Figure 12:
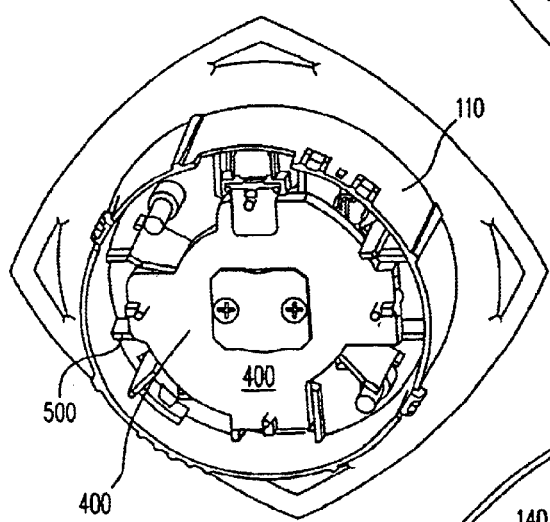
FIG. 12 shows a rear perspective view of an opened housing containing both the first of two side walls and a pendulum in accordance with the present invention.

FIG. 12 shows a rear perspective view of an opened housing 110 with both the first of two sidewalls 500 and a pendulum 400 in accordance with the present invention. A next step in assembly places pendulum 400 having pins 420 next to the first sidewall 500. The pendulum 400 is placed next to the first sidewall 500 such that the pins 420 are properly located in the confines of the open volume 513 (not labeled). The second complementary sidewall 500 (not shown) is placed next to the pendulum 400 and first sidewall 500 and is physically joined thereto by connection posts 540.

Figure 13:
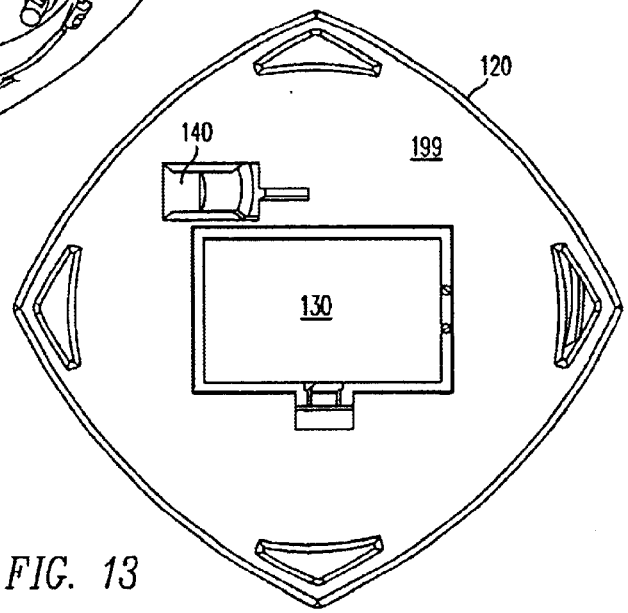
FIG. 13 shows a rear perspective view of a closed housing in accordance with the present invention.

FIG. 13 shows a rear perspective view of a closed housing 120 in accordance with the present invention. Once the sidewalls 500 and pendulum are placed in the housing 120, an end cap 199 covers the back of the housing 120. The end cap 199 may contain a built-in battery compartment 130 and may have a built-in tack holder 140. Tack holder 140 holds a tack (to mount the line generator to a wall) in it by either magnetic coupling or friction.

Alternatively, the second sidewall 500 may integrate the functionality of the sidewall on one side, and the features of the end cap on the other side. This combines the second sidewall 500 and the end cap 199 into a single housing unit.

Figure 14:
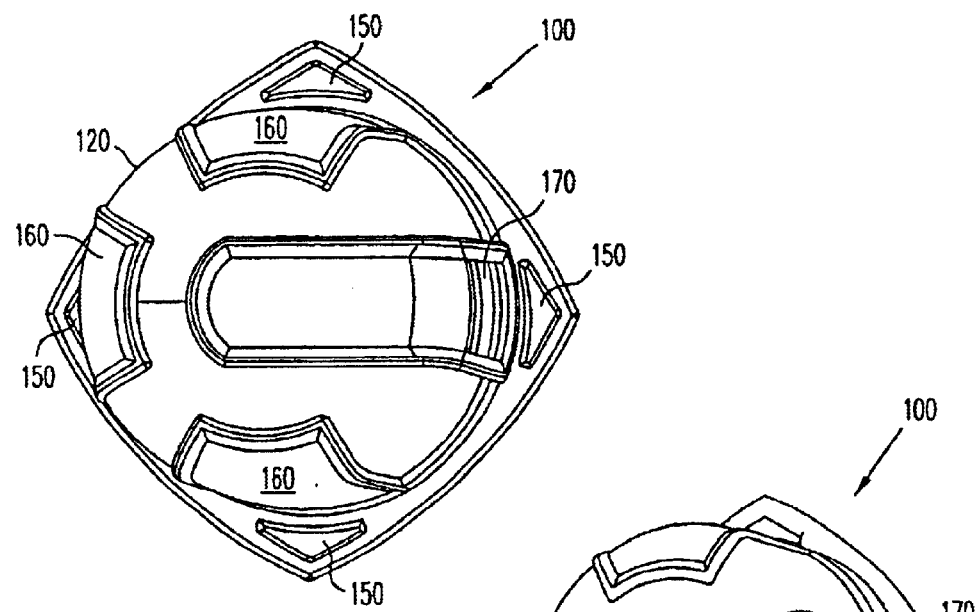
FIG. 14 shows a front perspective view of a housing in accordance with the present invention.

FIG. 14 shows a front perspective view of a housing 120 in accordance with the present invention. The top housing 120 defines four support holes 150 corresponding to each of the predetermined angles of operation. A single nail or tack may be inserted into the wall at the location just above where a user wants to emit the light beam. The line generator 100, when positioned to hang from nail or tack at one of the support holes 150, acts as a whole as a crude self-leveling pendulum. Due to friction between the wall and the line generator 100, however, the line generator 100 may not be perfectly aligned. The internal pendulum 400 operates without the impediments of wall friction to create a finely adjusted level.

The top housing 120 optionally contains hand grips 160, which also indicate the general orientations of the predetermined angles. The top housing 120 also defines an opening or window 170, which allows the laser light to pass there through.

Figure 15A:
FIGS. 15A and 15B front perspective view of a collapsed self-leveling wall line generator 100 and an expanded self-leveling wall line generator 100 in accordance with the present invention.
Figure 15B:
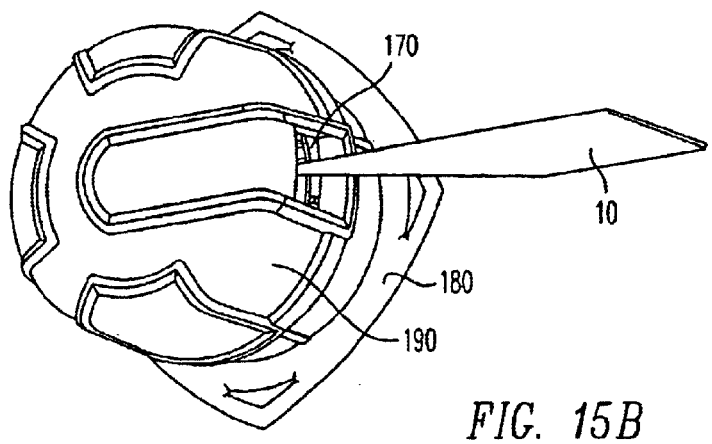

FIGS. 15A and 15B are front perspective view of a collapsed self-leveling wall line generator 100 and an expanded self-leveling wall line generator 100 in accordance with the present invention in a telescoping configuration. Embodiments of the present invention have a bottom housing 180 and a top housing 190 that work together as a telescoping apparatus. When the top housing 190 is extended from the bottom housing 180, a window (shutter) 170 is opened allowing the laser light to pass out from the line generator 100. An internal switching mechanism (not shown) may be used to supply power to the laser 430 once the top housing 190 has been pulled from the bottom housing 180, thereby eliminating the need for a separate user operated power switch. As the housing is collapsed, the same internal switching mechanism may be used to turn off power to the laser 430. Additionally, the internal pendulum 400 and sidewalls 500 are mounted in the top housing 190 so that the laser beam is raised perpendicularly away from (stands off) the vertical (wall) surface, thus extending the length of the visible line projected on the vertical surface.

While the present invention has been described with reference to one or more particular variations, those skilled in the art will recognize that many changes may be made thereto without departing from the spirit and scope of the present invention. Each of these embodiments and obvious variations thereof are contemplated as falling within the spirit and scope of the claimed invention, which is set forth in the following claims.

What is claimed as new and desired to be protected by Letters Patent of the united states is:

1. A light emitting tool comprising:
   a housing;
   a pendulum having a light source; and
   a plurality of receiving elements defined in one of the housing and the pendulum, and a plurality of extensions defined on the other of the housing and the pendulum;

wherein the plurality of extensions define a plurality of pivot axes of the pendulum and the pendulum is substantially free in the housing; and wherein the receiving elements cooperatively interact with the plurality of extensions thereby to bound free movement of the pendulum.

2. The light emitting tool of claim 1, wherein each receiving element being configured to define at least one obtuse angle for supporting the extensions thereby to bound the free movement of the pendulum.

3. The light emitting tool of claim 1, wherein each receiving element defines an inner surface lying at an angle relative to an inner surface of the housing thereby to allow free movement of the extensions relative to a corresponding receiving element.

4. The light emitting tool of claim 1, wherein the housing comprises first and second portions, one portion lying on each side of the pendulum and each receiving element being defined in both the first and second portions.

5. A light emitting tool comprising:

a housing and a pendulum, the pendulum having a light source and a plurality of pivot axes;

wherein the light source emits light along a substantially vertical surface in any one of a plurality of predefined directions along the substantially vertical surface, and wherein each of the plurality of predefined directions is determined by which one of the pivot axes is engaged.

6. The light emitting tool of claim 5, wherein the plurality of predefined directions include up, down, left and right.

7. A light emitting tool comprising:

a housing having a plurality of receiving elements defined therein; and a pendulum having a body, a light source and a plurality of extensions extending from the body;

wherein each of the extensions is positioned in a corresponding one of the receiving elements; and wherein the extensions define a plurality of pivot axes of the pendulum parallel to one another.

8. The light emitting tool of claim 7, wherein each of the receiving elements defines a guiding surface lying perpendicular to the corresponding extension to guide the pendulum along the receiving element to a pivot axis.

9. The light emitting tool of claim 8, wherein the guiding surface lies in two planes positioned at an obtuse angle for guiding the extension along at least a portion of the obtuse angle.

10. The light emitting tool of claim 9, wherein a vertex of the obtuse angle defines a cylindrical surface for accommodating the extension on the cylindrical surface.

11. The light emitting tool of claim 9, wherein the two planes of each receiving element are joined by a surface defining an arc having a radius of curvature larger than a radius of curvature of the corresponding extension, thereby allowing each of the receiving elements to make contact with the corresponding extension along a single line.

12. The light emitting tool of claim 7, wherein each of the receiving elements includes a tapered surface configured to allow a non-engaged extension in the receiving element unobstructed movement.

13. The light emitting tool of claim 8, wherein the guiding surface is lubricated.

14. The light emitting tool of claim 7, wherein the housing is of a plastic material.

15. The light emitting tool of claim 7, wherein the body of the pendulum is nonferrous metal.

16. The light emitting tool of claim 15, wherein the nonferrous metal is Zinc.

17. The light emitting tool of claim 15, further comprising one or more pairs of damping elements fixed in the housing.

18. The light emitting tool of claim 7, wherein the housing further having a first side frame element parallel to and opposite a second side frame element, wherein each side frame element is perpendicularly telescopically affixed thereby permitting extension of the second side frame element away from the first side frame element.

19. The light emitting tool of claim 18, the housing defining an opening for passage of light from the light source when the housing is in its extended position and which is closed when housing in it a collapsed position.

20. The light emitting tool of claim 18, further comprising a switch connected to supply power to the light source when the housing is extended.

21. The light emitting tool of claim 7, wherein the light source is a laser diode.

22. A light emitting tool for emitting a beam of light in one of any four directions to a surface, the tool comprising:

a pendulum having a body, a light source and a plurality of pairs of extensions, wherein each one of the pairs of extensions defines a pivot axis; and a housing having a plurality of corresponding pairs of recesses, wherein each of the corresponding pairs of recesses accepts a unique one of the pairs of extensions;

wherein, when the tool is oriented in any one of the four directions to the surface, the pendulum contacts the housing along only one of the pivot axes.

23. A method to project a light beam to a surface in any one of four directions using a light emitting tool, the method comprising the acts of:

directing the tool towards the surface;

rotating the tool to an orientation near that of a desired direction; and allowing the tool to self-balance on one of a plurality of pivot axes, thereby projecting the light beam from the tool and towards the surface in the desired direction.

24. The method of claim 23, wherein the tool has only one light source.

25. The method of claim 23, wherein the plurality of pivot axes defines four pivot axes each spaced about 90° apart, each axis corresponding to one of the four directions.

26. A light emitting tool comprising:

a housing and a self-leveling mechanism, the self-leveling mechanism having a light source and a plurality of pivot axes;

wherein the light source emits light along a substantially vertical surface in any one of a plurality of predefined directions along the substantially vertical surface, and wherein each of the plurality of predefined directions is determined by which one of the pivot axes is engaged.

27. A light emitting tool comprising:

a housing and a self-leveling mechanism, the self-leveling mechanism having a light source and a plurality of pivot axes;

wherein the light source emits light at a surface in any one of a plurality of predefined directions at the surface, and wherein each of the plurality of predefined directions is determined by which one of the pivot axes is engaged.

28. The light emitting tool of claim 1, wherein each receiving element defines a tapered inter surface thereby to allow free movement of the extensions relative to a corresponding receiving element.

29. A light emitting tool comprising:

a housing having a plurality of receiving elements defined therein; and a pendulum having a body, a light source and a plurality of extensions extending from the body;

wherein each of the extensions is positioned in a corresponding one of the receiving elements;

wherein each of the receiving elements defines a guiding surface lying perpendicular to the corresponding extension to guide the pendulum along the receiving element to a pivot axis; and wherein the guiding surface lies in two planes positioned at an obtuse angle for guiding the extension along at least a portion of the obtuse angle.

30. The light emitting tool of claim 29, wherein a vertex of the obtuse angle defines a cylindrical surface for accommodating the extension on the cylindrical surface.

31. The light emitting tool of claim 29, wherein the two planes of each receiving element are joined by a surface defining an arc having a radius of curvature larger than a radius of curvature of the corresponding extension, thereby allowing each of the receiving elements to make contact with the corresponding extension along a single line.

\* \* \* \* \*